Jan. 16, 1940. H. C. RHODES 2,187,214
DOUGH MOLDING MACHINE
Filed Dec. 6, 1937 2 Sheets-Sheet 2
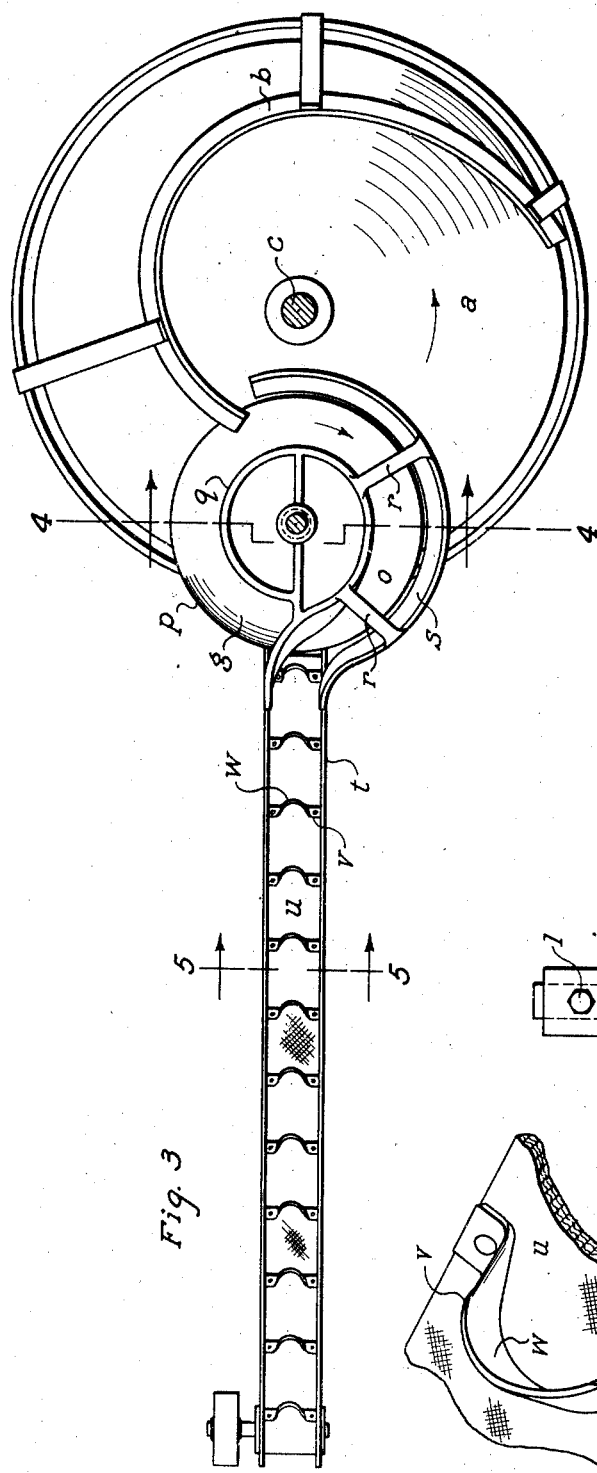
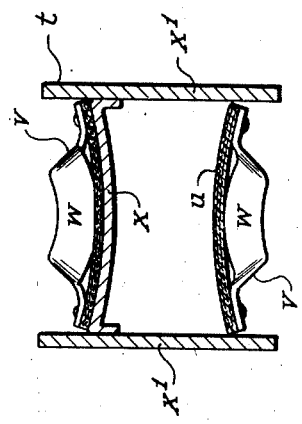
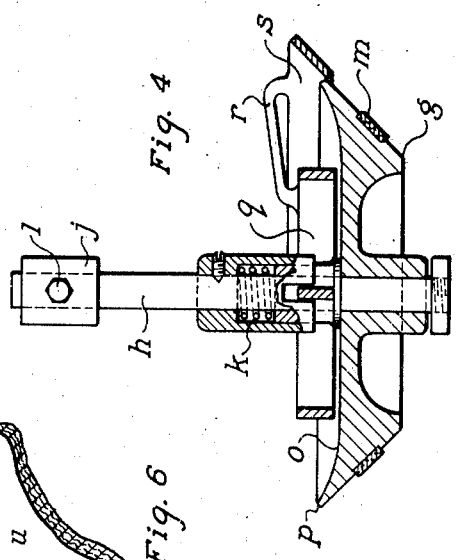
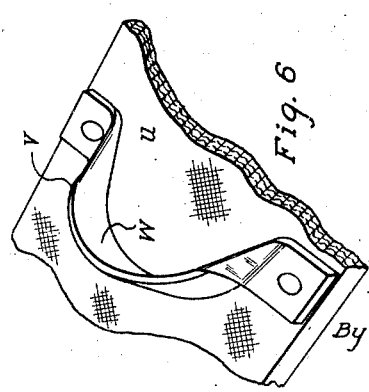
Inventor
Herbert C. Rhodes
By T. J. Geisler, and
R. R. Geisler
Attorneys Patented Jan. 16, 1940

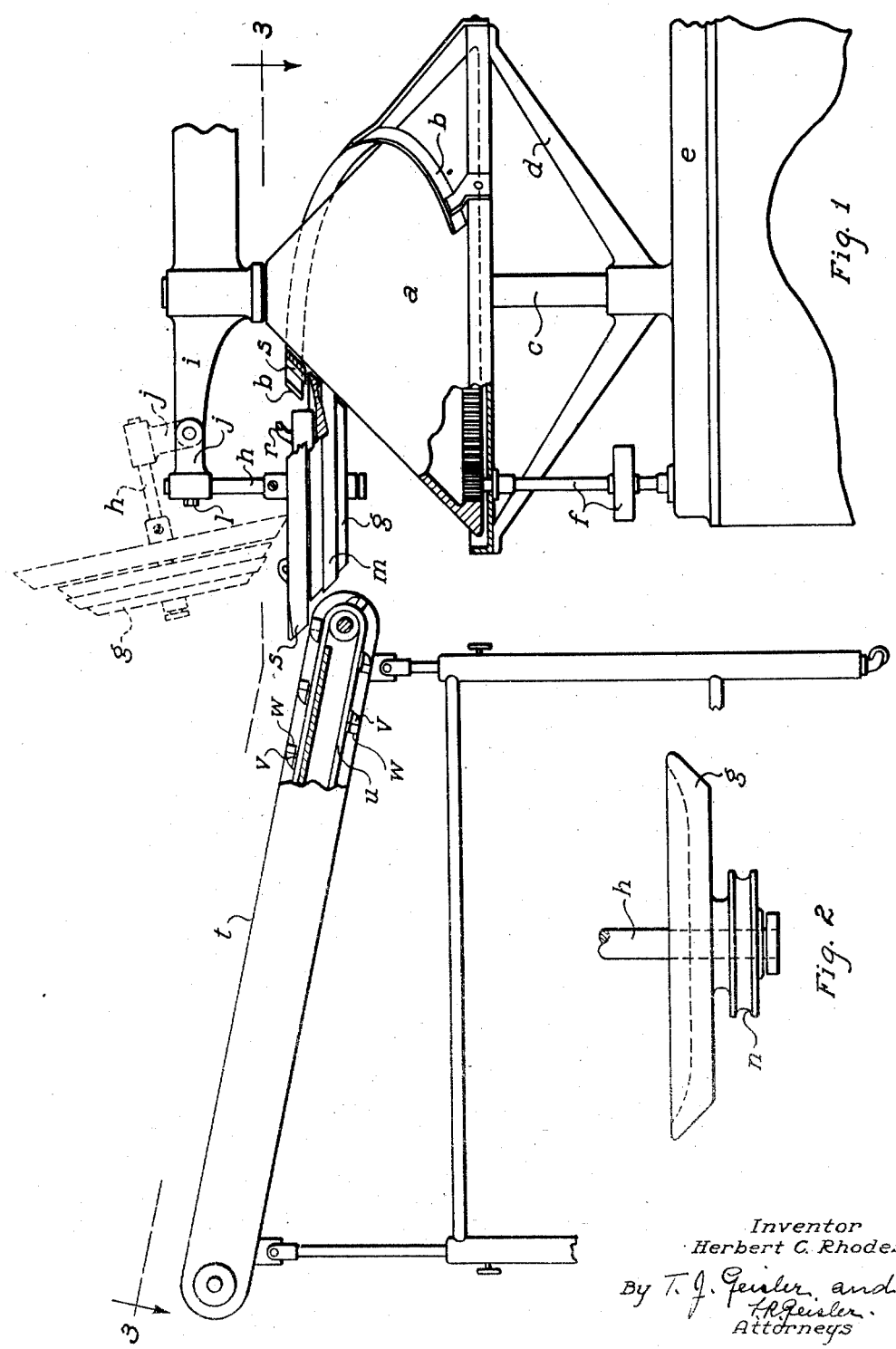

2,187,214

UNITED STATES PATENT OFFICE 2,187,214

DOUGH MOLDING MACHINE

Herbert C. Rhodes, Portland, Oreg.

Application December 6, 1937, Serial No. 178,288

5 Claims. (Cl. 107—9)

My invention relates to machines for shaping or rounding pieces of dough as received from a "divider" previous to the further treatment of these dough pieces, preparatory to their being baked into rolls; and my invention relates particularly to molding machines in which the dough pieces are molded more or less into spherical form by being rolled between two molding elements, namely, the surface of a rotating rounding-cone and the cooperating, stationary spiral mold-bar, against which the dough pieces are caused to travel to a predetermined level of the rounding-cone and thence transferred to further devices or to a bench preparatory to the baking of the dough balls into rolls.

Since the dough balls must be carried from said molding machine to some distant point for completing the processing of the dough balls before baking, it is necessary that such transfer be expeditiously and efficiently accomplished.

The device for accomplishing such transfer generally comprises an inclined chute to which the molded dough pieces or balls are delivered, and down which these dough balls are then permitted to roll onto a conveyor. The dough balls, however, tend to stick more or less in the chute.

It is practically impossible to make a plastic mass roll over a stationary surface. Therefore, in order to promote the rolling of the dough balls down the chute, it is necessary to sift flour constantly into the chute. The aggregate amount of flour so used is quite an amount, and it is, moreover, wasted, for the flour sifted into the chute adds nothing to the dough balls; to the contrary, too much raw flour applied to the exterior of the dough balls is a detriment; it toughens the crust and affects the appearance of the rolls by giving them a pale or unbaked appearance.

The principal object of my invention is, therefore, to combine with the rotating rounding-cone commonly a part of rounding machines, a mechanical means operating to transfer the molded dough pieces from said rotating cone onto a conveyor carrying the dough pieces to further devices or a bench.

The specific means which I have invented for this purpose comprises a revolving, horizontal transfer-plate rotated in unison with said rotated rounding-cone, and a fixed guide element disposed over said transfer plate for retaining the dough balls on said transfer-plate. This transfer-plate functions as a receiver for the dough balls discharged from the rounding cone and for transferring these balls, and depositing the same, onto a traveling belt or conveyor.

My invention further includes a particular kind of conveyor belt preferably used by me, by which the dough balls as deposited thereon are evenly spaced from each other and centered so as to assure the feeding of the dough balls at conveniently timed intervals, singly, onto some other device, or a bench. The centering of the dough balls on the belt also facilitates picking the dough balls off the belt for placing in a baking pan; then to be baked without further processing.

Other specific features of my invention, and the details of construction and operation thereof are hereinafter fully described with reference to the accompanying drawings.

In the drawings:

Fig. 1 shows a diagrammatic elevation of a well-known type of dough molding device to which my invention is applied, the devices constituting my invention being also shown, in part in section;

Fig. 2 is a detail illustrating that the "transfer-plate" of my invention may be driven independently, instead by friction as shown in Fig. 1; the driving of the transfer-plate may be effected as deemed best, so long as it is driven in unison with the dough molding machine;

Fig. 3 is a sectional plan with section taken on the broken line 3—3 of Fig. 1;

Fig. 4 is a larger scale sectional detail of my "transfer-plate" and associated guide element taken on line 4—4 of Fig. 3;

Fig. 5 shows an enlarged cross-section taken on the line 5—5 of Fig. 3 of my improved conveyor, also showing the preferred support thereof between guide walls; and.

Fig. 6 is a detail of one of the cleats provided on the belt element of my conveyor, these cleats being preferably formed of a semi-resilient or soft material—leather for example—and shaped to provide a medial pocket open to the direction of travel of the belt.

It is assumed that a mass of dough is contained in a suitable receptacle and batches, or smaller masses thereof, are consecutively delivered by devices, not shown, onto the rounding cone $a$ with which cooperates a spiral mold-bar $b$ fixed in place over the rounding cone. Thus, by the rotation of the latter in direction pointed by the arrow in Fig. 1, the pieces of dough deposited on the rounding cone $a$ will climb and be rolled against the mold-bar $b$ and caused to assume a more or less spherical shape. The rounding cone is rotatably supported on a vertical shaft $c$ in a frame *d* all mounted on a base *e*, and the rounding cone may be driven as indicated at *f*.

In combination with the rounding cone *a* I provide a transfer-plate *g* rotatably carried by a shaft *h* pendent from a horizontal arm *i* projecting from the top of the shaft *c*. The shaft *h* is supported by a hinged bracket *j* so that the transfer-plate *g* may be moved away from the rounding cone *a*. The shaft *h* is removably secured on the hinged bracket *j* by a set-screw *l*. The transfer-plate *g* may be of conical shape and provided on its circumference with a friction band *m* which bears against the surface of the rounding cone *a* and thus is driven in unison therewith.

The transfer-plate *g* is permitted longitudinal movement on its axis of rotation, but is normally held down by a coil spring as indicated at *k* in Fig. 4; in that way maintaining driving contact between the rounding cone; and the transfer-plate, at the same time, allowing for irregularities produced on the surface of the rounding cone by the dropping of flour thereon.

Instead of driving the transfer-plate *g* from the rounding-cone, of course, it may be independently driven by providing it at the bottom with a pulley, as indicated by *n* in Fig. 2, to receive a driving belt.

The upper face of the transfer-plate *g* is dished, as indicated by *o*, to provide a circumferential rim for restraining the dough pieces deposited on the transfer-plate *g* against being thrown off by centrifugal force.

Over the transfer-plate *g* is provided a stationary guide element *q* which functions to conduct the dough pieces deposited on the transfer-plate towards and over its rim and onto the conveyor *t*. As shown in the drawings, there is rigidly supported on the shaft *h* a channel-like guide element composed of inner and outer guide rails arranged in evolute form and supported by arms *r* and adapted to move the pieces deposited on the transfer-plate over its rim, and thus off said transfer plate onto the conveyor *t*.

This conveyor preferably comprises a belt *u* provided with spaced cleats *v* which are preferably made of leather and shaped, as shown more clearly by Fig. 6, to provide medial pockets *w* open to the direction of travel of the belt, and the belt *u* is preferably supported in a trough-like guideway *t*, as shown in Fig. 5, comprising side walls *x′* connected by a transversely concaved web *x* so as to make the upper course of the traveling belt *u* concave as shown in Fig. 5. This concaving transversely of the dough pieces carrying section of the belt *u* cooperates with the pockets *w* of the transverse cleats *v* for holding the dough pieces spaced from each other and centered on the belt *u*; and the placing of the dough pieces in that manner on the belt *u* facilitates the picking of the dough pieces off the belt for placing in a baking pan, where there is to be no further processing of the dough pieces before baking. Where the dough pieces carried by the conveyor are to be further processed by other devices before baking, the outer end of the conveyor would be adjusted to desired higher or lower levels. When the dough pieces are to be picked off the belt *u* for panning and baking the conveyor is adjusted to horizontal position.

I do not limit my invention to the specific devices or details of construction above described except as set forth in the following claims.

I claim:

1. In a dough molding machine, in combination with the driven rounding-cone and a spiral mold-bar disposed over said cone, a horizontal conical transfer-plate rotated in unison with said cone, and arranged to receive the pieces discharged therefrom, a guide element disposed over said transfer-plate, and arranged to move off the transfer-plate the pieces deposited thereon, the circumferential face of said transfer-plate provided with a friction band bearing on said rounding-cone.

2. In a dough molding machine, in combination with the driven rounding-cone and a spiral mold-bar disposed over said cone, a horizontal transfer-plate rotated in unison with said cone, and arranged to receive the pieces discharged therefrom, a guide element disposed over said transfer-plate, and arranged to move off the transfer-plate the pieces deposited thereon, the transfer-plate being mounted on a pendent shaft and adapted to permit longitudinal movement on its axis of rotation but normally held against such movement and thus kept in operative contact with said rounding-cone.

3. The combination described by claim 2 distinguished in that the transfer-plate is mounted on a pendent hinged shaft.

4. In a dough molding machine having a driven rounding-cone and a spiral mold bar disposed over said rounding-cone, a horizontal, rotated transfer plate driven from said rounding cone and arranged to receive the dough pieces discharged therefrom, the upper surface of said transfer plate being dished and the rim of said upper face of the transfer-plate adapted to restrain the dough pieces deposited thereon against being thrown off by centrifugal force, and a guide element disposed over said transfer plate and arranged to move from the upper face thereof the dough pieces deposited thereon during the rotation of said rounding-cone.

5. In a dough molding machine having a driven rounding-cone and a spiral mold bar disposed over said rounding-cone, a vertical shaft and a horizontal, rotated transfer plate carried by said shaft and of inverted conical form in cross-section, the rim of said transfer plate having driving connection with and being driven by said rounding-cone and arranged to receive the dough pieces discharged therefrom, the upper surface of said transfer plate being dished and the rim of said upper face of the transfer plate adapted to restrain the dough pieces deposited thereon against being thrown off by centrifugal force, said transfer plate being permitted axial yielding movement on said shaft but normally held in driving connection with said rounding-cone, and a guide element disposed over said transfer plate and arranged to move from the upper face thereof the dough pieces deposited thereon during the rotation of said rounding-cone.

HERBERT C. RHODES.